United States Patent
Yamasaki

(10) Patent No.: US 9,317,791 B2
(45) Date of Patent: Apr. 19, 2016

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: Shozo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/606,945

(22) Filed: Jan. 27, 2015

(65) Prior Publication Data

US 2015/0213346 A1 Jul. 30, 2015

(30) Foreign Application Priority Data

Jan. 29, 2014 (JP) .................................. 2014-014774

(51) Int. Cl.
*G06K 15/00* (2006.01)
*G03G 15/00* (2006.01)
*G06F 1/00* (2006.01)

(52) U.S. Cl.
CPC .............. *G06K 15/408* (2013.01); *G03G 15/00* (2013.01); *G06F 1/00* (2013.01); *G06K 15/4055* (2013.01)

(58) Field of Classification Search
USPC .......................... 358/1.14, 468, 400, 401, 500
See application file for complete search history.

(56) References Cited

U.S. PATENT DOCUMENTS

| | | | | |
|---|---|---|---|---|
| 5,596,366 A | * | 1/1997 | Takashima et al. | 348/208.16 |
| 6,280,327 B1 | * | 8/2001 | Leifer et al. | 463/39 |
| 2010/0246424 A1 | * | 9/2010 | Tsuzuki | 370/252 |
| 2012/0182004 A1 | * | 7/2012 | Higuchi et al. | 323/284 |
| 2014/0324070 A1 | * | 10/2014 | Min et al. | 606/130 |

FOREIGN PATENT DOCUMENTS

| | | | | |
|---|---|---|---|---|
| CN | 102006385 A | * | 4/2011 | G03G 15/5004 |
| JP | 2002-095276 A | | 3/2002 | |

* cited by examiner

*Primary Examiner* — Jerome Grant, II
(74) *Attorney, Agent, or Firm* — Canon USA, Inc., IP Division

(57) ABSTRACT

An information processing apparatus includes a first control unit that outputs a command for driving an electric part, a detection unit that detects an abnormality of the first control unit, and a second control unit that controls whether or not supply of a drive signal based on the command for driving the electric part to the electric part can be performed, in which the first control unit outputs instruction signals for instructing execution and stop of the detection by the detection unit, and the second control unit cuts off the supply of the drive signal to the electric part in a case where the detection unit detects the abnormality of the first control unit and a case where the instruction signal for instructing the stop of the detection by the detection unit is output from the first control unit.

11 Claims, 8 Drawing Sheets

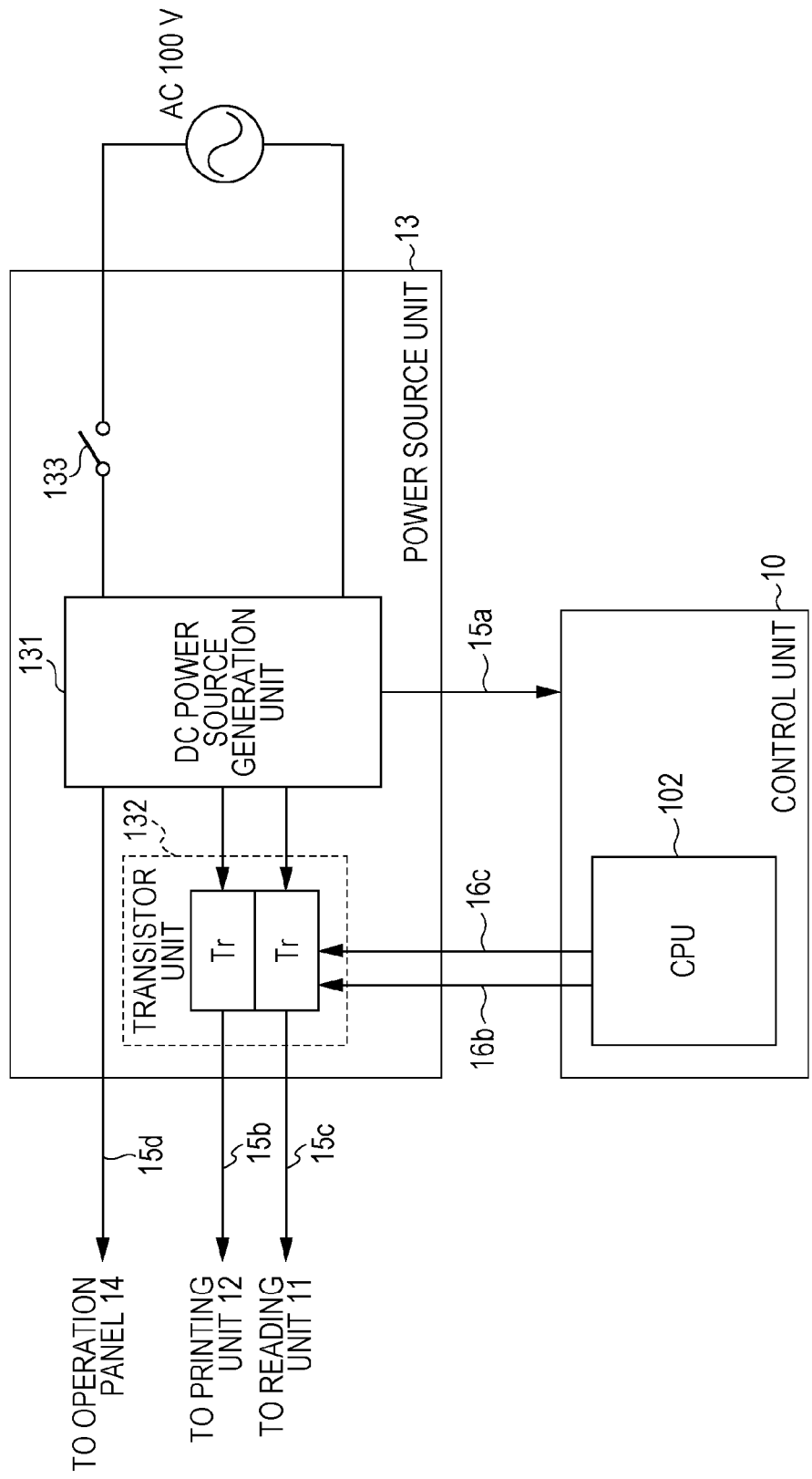

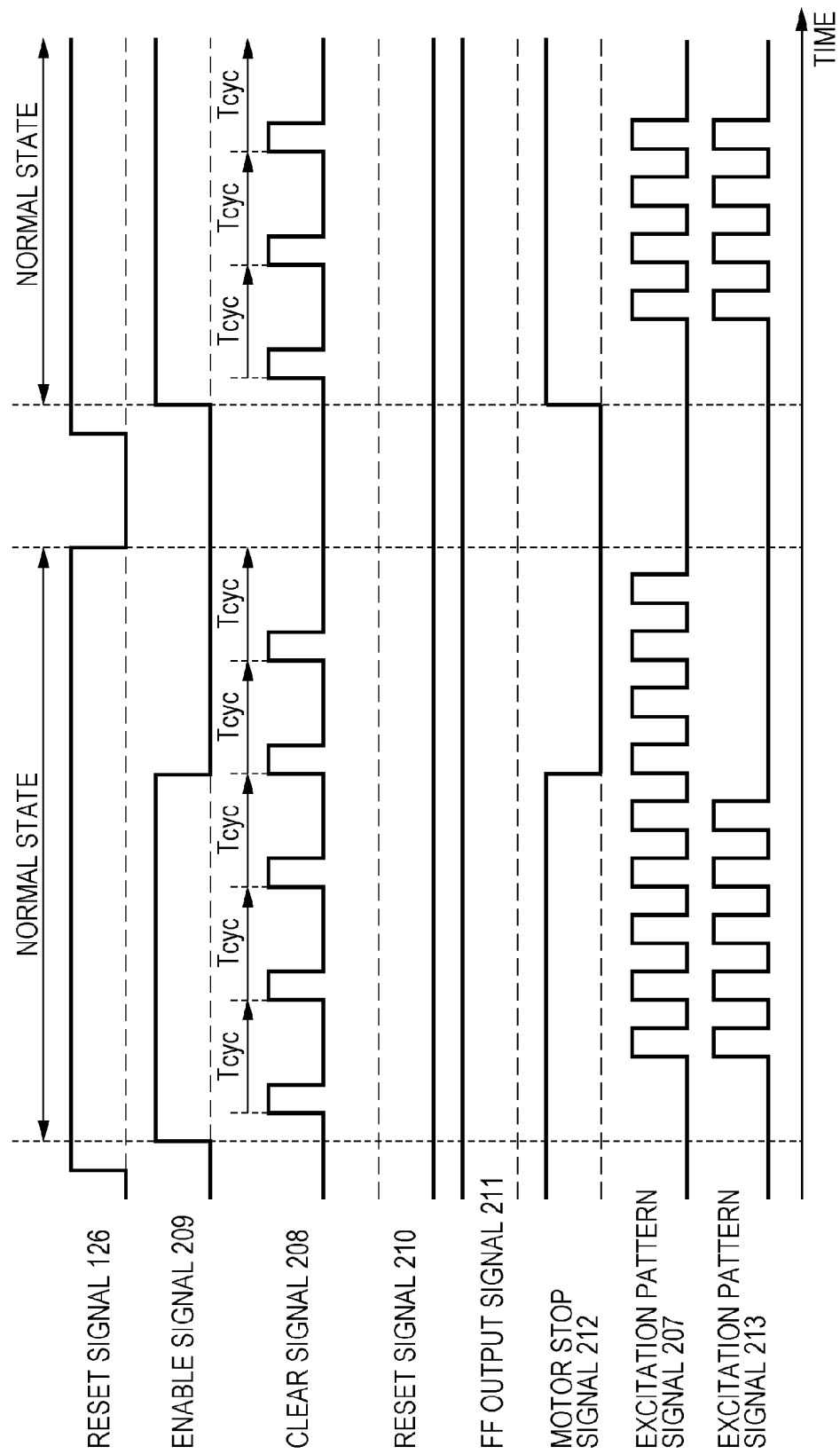

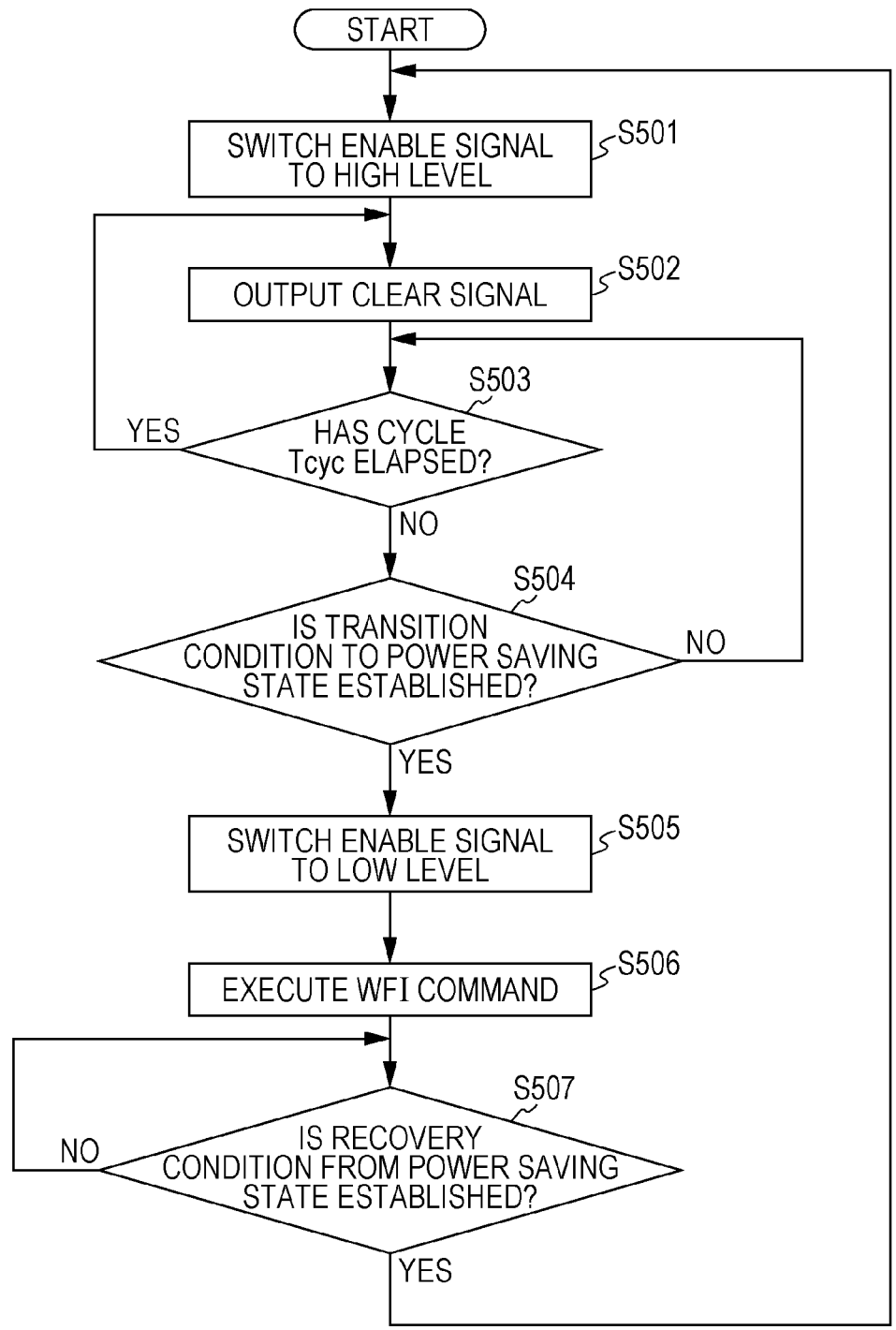

INFORMATION PROCESSING APPARATUS AND CONTROL METHOD FOR INFORMATION PROCESSING APPARATUS

BACKGROUND OF THE INVENTION

1. Field of the Invention

The present invention relates to an information processing apparatus and a control method for the information processing apparatus, and the invention particularly relates to an information processing apparatus preferably used for stopping operation of an electronic part.

2. Description of the Related Art

In an image forming apparatus having a plurality of functions such as a copier, a printer, and a facsimile, an electronic part such as a motor used for actuating the apparatus is arranged.

A central processing unit (CPU) generally controls drive of the electronic part. Japanese Patent Laid-Open No. 2002-95276 proposes a technology for stopping the electronic part when the CPU runs out of control as a technology used for a control circuit of the electronic part.

The technology described in Japanese Patent Laid-Open No. 2002-95276 relates to a motor drive apparatus including a motor controller that outputs a control signal for driving the motor in accordance with a command from the CPU and a motor driver that outputs a driving signal to the motor on the basis of the control signal from the motor controller. According to the technology described in Japanese Patent Laid-Open No. 2002-95276, an abnormality of the CPU is detected by a watchdog timer. While the CPU normally operates, a clear signal of a timer is repeatedly output to the watchdog timer from the CPU at a certain period interval. When the clear signal is received, the watchdog timer clears a timer counting value. When the clear signal is not output from the CPU because of the runaway of the CPU or the like, the time is up for the watchdog timer, and a reset signal is output from the watchdog timer. According to the technology described in Japanese Patent Laid-Open No. 2002-95276, the drive signal to the motor is forcedly cut off to stop the motor by using the reset signal from the watchdog timer.

However, according to the technology described in Japanese Patent Laid-Open No. 2002-95276, when a configuration in which the function of the watchdog timer can be stopped by the CPU is adopted, in a case where the function of the watchdog timer is stopped because of the runaway of the CPU, the detection of the abnormality of the CPU by the watchdog timer is not performed. Therefore, a state in which the motor is not stopped and continues to be driven may occur.

SUMMARY OF THE INVENTION

In view of the above, even when operation of detecting an abnormality of a unit that outputs a command for driving an electronic part is stopped because an abnormality occurs in the operation of the unit, the present invention aims at making it possible to stop the electronic part.

An information processing apparatus according to an aspect of the present invention includes: a first control unit that outputs a command for driving an electric part; a detection unit that detects an abnormality of the first control unit; and a second control unit that controls whether or not supply of a drive signal based on the command for driving the electric part to the electric part can be performed, in which the first control unit outputs instruction signals for instructing execution and stop of the detection by the detection unit, and the second control unit cuts off the supply of the drive signal to the electric part in a case where the detection unit detects the abnormality of the first control unit and a case where the instruction signal for instructing the stop of the detection by the detection unit is output from the first control unit.

Further features of the present invention will become apparent from the following description of exemplary embodiments with reference to the attached drawings.

BRIEF DESCRIPTION OF THE DRAWINGS

FIG. 3 illustrates a configuration of a power source unit.

FIG. 4C illustrates a third example of the changes in the respective signals of the reading unit I/F.

FIG. 5 is a flow chart for describing an example of operation of a CPU.

DESCRIPTION OF THE EMBODIMENTS

Before exemplary embodiments of the present invention will be described, first, descriptions will be given of a specific example in a case where a function of a watchdog timer is to be stopped by a CPU.

A power saving mode in which electricity supply to unused parts in an electric circuit is cut off, and the electricity supply only to required minimum circuit parts is performed has been proposed for an information processing apparatus such as an image forming apparatus to reduce the power consumption of the apparatus. In the power saving mode, the electricity supply only to a control circuit of the apparatus and circuit parts associated with a recovery factor from facsimile, a recovery factor from a network or a personal computer, and a recovery factor from an operation unit key is performed, and no power source is supplied to the other parts.

Moreover, in recent years, a sleep mode for stopping operation within a CPU has been used for the further reduction in the power consumption. Recovery of the CPU from the sleep mode is realized when the CPU receives an interrupt signal. For that, a signal related to the above-described recovery factor is used as the interrupt signal for the CPU. In the sleep mode, an internal clock of the CPU is stopped, and the power consumption of the CPU is particularly reduced. Therefore, it is possible to reduce the power consumption of the apparatus.

In the sleep mode, the internal clock of the CPU is stopped (that is, the operation in the CPU is stopped). For this reason, a clear signal is not output from the CPU to the watchdog timer in the sleep mode. Therefore, the time is up for the watchdog timer. In view of the above, according to the present exemplary embodiment as will be described below, when the mode is shifted to the sleep mode, the function of the watchdog timer is previously stopped, so that a situation where the time is up for the watchdog timer is avoided.

As described above, according to the exemplary embodiment of the present invention, a case where the function of the watchdog timer is stopped by the CPU when the mode is shifted to the sleep mode will be described as an example.

Hereinafter, the exemplary embodiment of the present invention will be described with reference to the drawings.

According to the present exemplary embodiment, a case where the information processing apparatus is the image forming apparatus will be described as an example.

Figure 1:
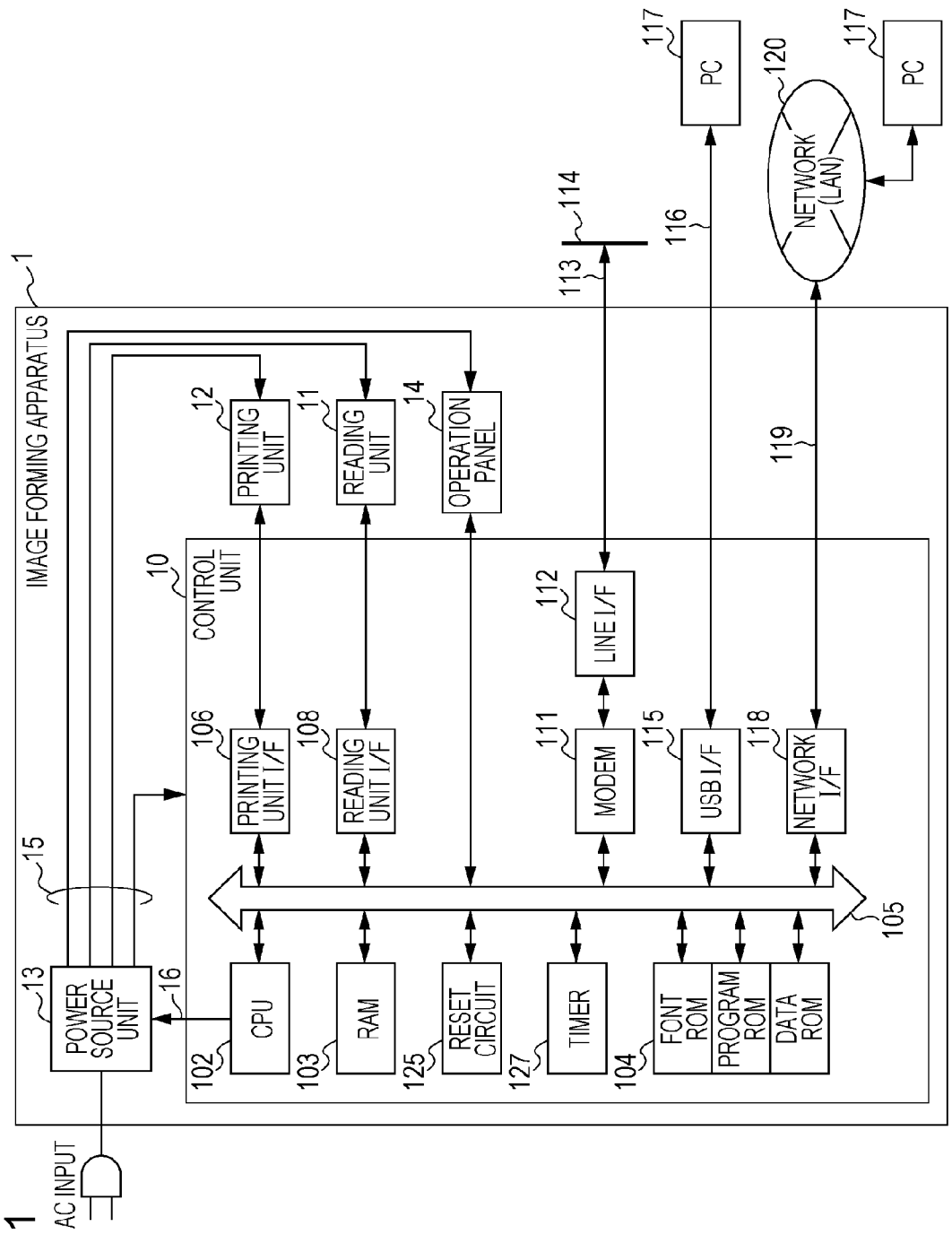
FIG. 1 illustrates a configuration of an image forming apparatus.

FIG. 1 illustrates an example configuration of image forming apparatus 1. The image forming apparatus 1 includes a printing unit 12, a reading unit 11, an operation panel 14, a power source unit 13, and a control unit 10 that governs control on these units. Functions of printing, scanning, copying, facsimile, and the like are realized while these respective units operate in conjunction with each other.

The control unit 10 is an apparatus configured to execute image processing or the like on the basis of image data received from the outside of the apparatus and form an image on a sheet, for example. The image data is transmitted, for example, from the reading unit 11, a host computer 17 corresponding to an external apparatus, or a facsimile apparatus connected via a PSTN line (a public line network 114) to the control unit 10.

The reading unit 11 reads an original as image data and transmits the read image data to the control unit 10. The reading unit 11 includes, for example, a scanner unit having a function of reading the original and an original sheet feeding unit having a function of conveying an original sheet.

The printing unit 12 conveys a recording sheet and prints the image data received from the control unit 10 on the sheet as a visible image by an electrophotographic system or the like to be discharged to the outside of the apparatus. The printing unit 12 includes, for example, a sheet feeding unit having plural types of recording sheet cassettes, a marking unit having a function of transferring the image data onto the recording sheet to be fixed, and a sheet discharging unit having a function of performing sorting and stapling the printed recording sheets to be discharged to the outside of the apparatus.

The power source unit 13 is a power source circuit that uses an alternating-current commercial power source (AC power source) as an input. The power source unit 13 supplies a direct-current power source 15 to the control unit 10, the reading unit 11, the printing unit 12, and the operation panel 14. The power source unit 13 also performs control on the supply and cutoff of the direct-current power source 15 by a control signal 16 from the control unit 10.

The operation panel 14 is configured to perform various settings on the basis of instructions from an operator (user). For example, the operation panel 14 performs various settings for forming an image of an original read by the reading unit 11 on a sheet by the printing unit 12. Specifically, the operation panel 14 is used for inputting selections such as the number of images to be formed, information related to a density when the image is formed, and a reading resolution of the scanner unit configured to read the original (for example, 300 dpi or 600 dpi) by a touch panel system.

The control unit 10 includes a CPU 102, a RAM 103, a ROM 104, a printing unit interface (I/F) 106, a reading unit I/F 108, a MODEM 111, a line I/F 112, a USB I/F 115, a network I/F 118, a reset circuit 125, and a timer 127. The respective blocks included in the control unit 10 are connected to each other via a system bus 105.

The CPU 102 controls the above-described respective blocks in an overall manner in accordance with various control programs. The various control programs are stored, for example, in a program area of the ROM 104 (program ROM). The CPU 102 reads out the control programs from the ROM 104 to be executed. Alternatively, the CPU 102 expands and develops data of the control programs stored in the ROM 104 while being compressed into the RAM 103 to be executed. The above-described control programs may also be stored in a hard disc drive (HDD) that is not illustrated in the drawing in a compressed state or in an uncompressed state.

The control program includes a wait for interrupt (WFI) command. When the WFI command is executed, the CPU 102 stops execution of a command code until the interrupt signal is received. Thereafter, when the interrupt signal is received, the CPU 102 resumes the execution from the command code subsequent to the WFI command.

The network I/F 118 performs processing for a communication with the host computer (PC) 117 via a network (LAN) 120 or the like. The network I/F 118 and the network 120 are connected to each other via a communication cable such as a LAN cable 119. The modem 111 is connected to the public line network 114 via the line I/F 112 and performs processing for a communication with another image forming apparatus that is not illustrated, a facsimile apparatus, a telephone set, or the like. The line I/F 112 and the public line network 114 are generally connected to each other via a telephone line 113.

The USB I/F 115 communicates with the host computer (PC) 117 via a universal serial bus (USB) cable 116.

The printing unit I/F 106 plays a role as an interface that outputs the image data to the printing unit 12 (printer engine). The reading unit I/F 108 plays a role as an interface that inputs a read image signal from the reading unit 11 (scanner engine). The CPU 102 processes image signal data input from a reading unit I/F 109 and outputs this data to the printing unit I/F 106 as recording image data.

The CPU 102 displays a character or a symbol on a display unit of the operation panel 14 by using font information stored in a font area of the ROM 104 (font ROM) and receives instruction information from the operation panel 14 that has received the instruction of the user.

The CPU 102 stores apparatus information of the image forming apparatus 1, telephone directory information of the user, divisional management information, and the like in data area (data ROM) of the ROM 104. These pieces of information are read out as appropriate by the CPU 102 and updated when needed.

Figure 2:
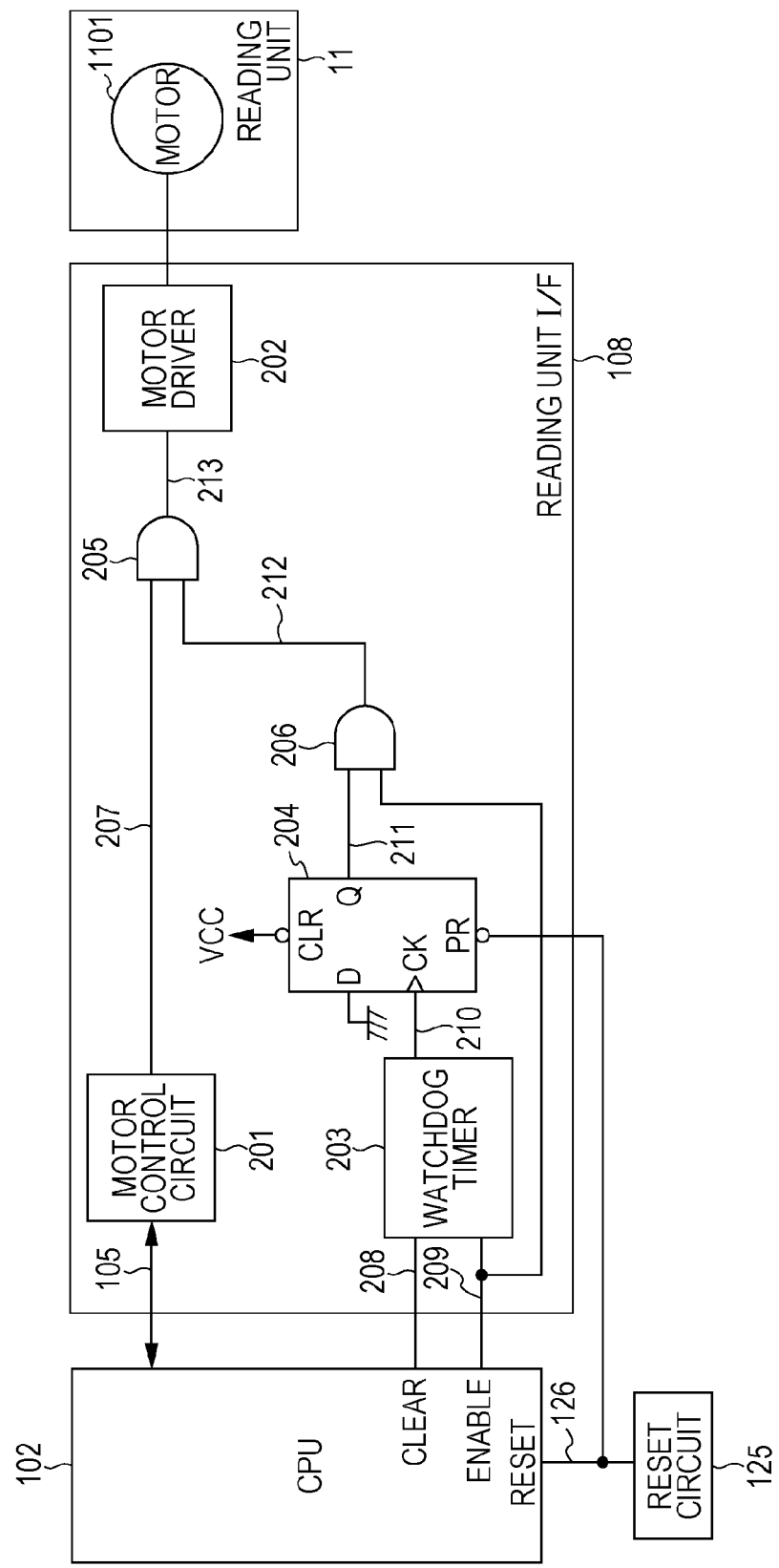
FIG. 2 illustrates a first example of a configuration of a reading unit I/F.

The reset circuit 125 is a circuit configured to output a reset signal 126 to the CPU 102 as illustrated in FIG. 2. The CPU 102 continues a reset state while the control unit 10 is supplied with the direct-current power source 15 and also the reset signal 126 is at a low level. Output of the reset signal 126 at the low level is performed by way of a setting of the CPU 102.

In addition, the reset signal 126 at the low level is output also in a case where a power source switch 133 of the power source unit 13 illustrated in FIG. 3 is turned off and the supply of the direct-current power source 15 is stopped. Furthermore, the reset signal 126 at the low level is output also in a case where the direct-current power source 15 is below a predetermined voltage level (for example, a case where the direct-current voltage of the power source at 3.3 V is below 2.9 V) because of power failure, instantaneous cutoff, or the like of the AC power source. Cancellation of the reset state of the CPU 102 is executed when a predetermined period of time elapses (for example, after 100 ms) since the control unit 10 is supplied with the direct-current power source 15, and the reset signal 126 from the reset circuit 125 is switched from the low level to the high level (high level).

In this manner, according to the present exemplary embodiment, when the reset signal 126 at the low level is output to the CPU 102, the CPU 102 is put into the reset state. On the other hand, when the reset signal 126 at the high level is output to the CPU 102, the reset state of the CPU 102 is cancelled.

The timer 127 performs time keeping on the basis of a time setting by the CPU 102 and generates the interrupt signal to the CPU 102 at a predetermined cycle.

FIG. 3 illustrates an example configuration of the power source unit 13. It is noted that FIG. 3 also illustrates a relationship between the CPU 102 and the power source unit 13.

In the example illustrated in FIG. 3, the power source unit 13 includes a DC power source generation unit 131, a transistor unit 132, and the power source switch 133.

The power source switch 133 switches the operation to manual operation by the user to turn on and off the power supply from the commercial power source (AC 100 V) to the DC power source generation unit 131.

The DC power source generation unit 131 performs voltage transformation and rectification with respect to the power supplied from the commercial power source and supplies the power on which the voltage transformation and the rectification have been performed to the respective units of the image forming apparatus 1 as direct-current power sources 15a, 15b, 15c, and 15d.

The transistor unit 132 includes a field effect transistor (FET) and the like. The transistor unit 132 controls an on-state and an off-state of the direct-current power sources 15b and 15c supplied to the printing unit 12 and the reading unit 11 on the basis of the control signals 16b and 16c from the CPU 102. The control signals 16b and 16c are respectively connected to output ports of the CPU 102.

In the normal state, on-state control is performed on the control signal from the CPU 102, and the direct-current power sources 15a, 15b, 15c, and 15d are supplied from the DC power source generation unit 131 to all of the control unit 10, the printing unit 12, the reading unit 11, and the operation panel 14.

The power saving state corresponds to the above-described sleep mode. In a case where a state in which no operation is performed by the user on the image forming apparatus 1 continues during a predetermined power saving state transition time Tsl in the normal state, the image forming apparatus 1 is shifted from the normal state to the power saving state.

The power saving state transition time Tsl is a time previously set on the basis of operation by the user on the operation key of the operation panel 14. The set power saving state transition time Tsl is supplied to the ROM 104 and read out by the CPU 102.

In the power saving state, the control unit 10 and the operation panel 14 are supplied with the power source from the DC power source generation unit 131. In addition, in the power saving state, the CPU 102 switches the output ports of the control signals 16b and 16c. Subsequently, the supply of the direct-current power sources 15b and 15c to the printing unit 12 and the reading unit 11 from the DC power source generation unit 131 is stopped in accordance with the control by the transistor unit 132.

Furthermore, in the power saving state, after the CPU 102 stops a function of a watchdog timer 203 which will be described below, the WFI command is executed to stop the operation of the CPU 102.

In this manner, the supply of the direct-current power source to a part of the circuits of the image forming apparatus 1 is stopped in the power saving state.

When the user performs, for example, any one of the following (A) to (D) at the time of the power saving state, the CPU 102 receives the interrupt signal, and the operation of the CPU 102 is resumed. The CPU 102 then operates the function of the watchdog timer 203 and switches the output ports of the control signals 16b and 16c to supply the direct-current power sources 15b and 15c to the printing unit 12 and the reading unit 11. With this configuration, the image forming apparatus 1 returns from the power saving state to the normal state.

(A) Press of the operation key of the operation panel 14
(B) Input of the image signal from the network I/F 118
(C) Input of the image signal from the USB I/F 115
(D) Input of the image signal from the modem 111

FIG. 2 illustrates an example configuration of the reading unit I/F 108.

A motor control circuit 201 controls drive of a motor 1101 used in the reading unit 11 via a motor driver 202. According to the present exemplary embodiment, the motor 1101 is a stepping motor. The motor control circuit 201 is operated in accordance with the command via the system bus 105 (setting of the data) which is issued by the CPU 102, and the motor driver 202 is supplied with an excitation pattern signal 207.

The watchdog timer 203 switches operation and stop of its own function in accordance with an enable signal 209 from the CPU 102. The watchdog timer 203 is operated when the enable signal 209 at the high level is received. On the other hand, the watchdog timer 203 stops when the enable signal 209 at the low level is received. After the function of the watchdog timer 203 is operated by the enable signal 209 at the high level, when a clear signal 208 is input from the CPU 102 within a predetermined cycle, the watchdog timer 203 detects an operation state of the CPU 102. If the clear signal 208 is not input from the CPU 102 within the predetermined cycle, the watchdog timer 203 switches the level from the low level to the high level and outputs a reset signal 210 to a D flip-flop 204 for a predetermined period of time.

After the direct-current power source 15a is supplied to the control unit 10, the D flip-flop 204 fixes an FF output signal 211 at the high level in a state in which the reset signal 126 from the reset circuit 125 is at the low level.

After the reset signal 126 is switched from the low level to the high level, the D flip-flop 204 performs the following processing when rising of the reset signal 210 from the watchdog timer 203 (switching from the low level to the high level) is received. That is, the D flip-flop 204 switches the FF output signal 211 from the high level to the low level.

Thereafter, as long as the reset signal 126 from the reset circuit 125 is not switched from the high level to the low level, the D flip-flop 204 keeps the FF output signal 211 at the low level. As described above, the CPU 102 is put in the reset state in accordance with the reset signal 126 at the low level, and the reset state of the CPU 102 is cancelled in accordance with the reset signal 126 at the high level.

The FF output signal 211 and the enable signal 209 are input to a two-input logical OR operation circuit 206. The two-input logical OR operation circuit 206 generates a motor stop signal 212. In a case where both the FF output signal 211 and the enable signal 209 are at the high level, the motor stop signal 212 is set at the high level, and the motor stop signal 212 is set at the low level in the other cases.

The motor stop signal 212 corresponding to the output of the two-input logical OR operation circuit 206 and the excitation pattern signal 207 are input to a two-input logical OR operation circuit 205. The two-input logical OR operation circuit 205 generates an excitation pattern signal 213. In a case where the motor stop signal 212 is at the high level, the two-input logical OR operation circuit 205 outputs the excitation pattern signal 207 as the excitation pattern signal 213 and outputs a signal at a 0 (zero) level as the excitation pattern signal 213 in the other cases. In this manner, whether or not the output of the excitation pattern signal 207 to the motor driver 202 can be performed is controlled.

When the CPU 102 switches the enable signal 209 from the high level to the low level, the watchdog timer 203 stops. At this time, the enable signal 209 input to the two-input logical OR operation circuit 206 is also switched from the high level to the low level.

As described above, the two-input logical OR operation circuit 206 switches the motor stop signal 212 to the low level in a case where at least one of the state of the FF output signal 211 at the low level and the state of the enable signal 209 at the low level is established. Accordingly, the supply of the excitation pattern signal 207 to the motor driver 202 is stopped.

In addition, as described above, when the CPU 102 switches the power state of the image forming apparatus 1 from the normal state to the power saving state, the enable signal 209 is switched from the high level to the low level to stop the watchdog timer 203.

In a case where the power state of the image forming apparatus 1 is the normal state, the CPU 102 switches the enable signal 209 of the watchdog timer 203 to the high level. After the watchdog timer 203 is operated, if the CPU 102 runs out of control, and the clear signal 208 is not input from the CPU 102 at the predetermined cycle, the reset signal 210 at the high level is output from the watchdog timer 203 for a predetermined period of time. Accordingly, the D flip-flop 204 switches the FF output signal 211 from the high level to the low level. Therefore, the supply of the excitation pattern signal 207 to the motor driver 202 can be stopped, and it is possible to stop the drive of the motor 1101.

When the CPU 102 switches the enable signal 209 of the watchdog timer 203 to the low level because of the runaway of the CPU 102, the enable signal 209 at the low level is input to the two-input logical OR operation circuit 206. Therefore, the supply of the excitation pattern signal 207 to the motor driver 202 can be stopped, and it is possible to stop the drive of the motor 1101.

Hereinafter, an example of the operation by the CPU 102 when the reading unit I/F 108 is controlled in accordance with the switching of the power state of the image forming apparatus 1 will be described with reference to a flow chart of FIG. 5.

In FIG. 5, a description will be given of processing for controlling the enable signal 209 and the clear signal 208 of the watchdog timer 203 that is controlled by the CPU 102 on the basis of the control programs stored in the ROM 104 (or expanded from the ROM 104 onto the RAM 103).

While the power source switch 133 of the image forming apparatus 1 is switched to the on-state by the user, when the direct-current power source 15a is supplied from the power source unit 13 to the control unit 10, the reset signal 126 is switched from the low level to the high level. As a result, the CPU 102 executes an initialization program and starts up the image forming apparatus 1 to put into the normal state.

First, in step S501, the CPU 102 switches the enable signal 209 of the watchdog timer 203 to the high level.

Next, step S502, the CPU 102 outputs the clear signal 208 to the watchdog timer 203.

As described above, the clear signal 208 is a signal generated by the CPU 102 and is a signal having a waveform cyclically repeated at a predetermined cycle Tcyc. Since the watchdog timer 203 confirms the input of the clear signal 208 at the predetermined cycle Tcyc, the reset signal 210 is held at the low level.

On the other hand, in a case where the CPU 102 runs out of control because of any cause, the clear signal 208 is not output from the CPU 102. Therefore, even when a time longer than or equal to the predetermined cycle Tcyc elapses since the immediately preceding clear signal 208 has been input, the next clear signal 208 is not input to the watchdog timer 203. As a result, the watchdog timer 203 holds the reset signal 210 at the high level for a predetermined period Trst and then returns the reset signal 210 to the low level.

In step S503, the CPU 102 uses the timer 127 to determine whether or not the predetermined cycle Tcyc (predetermined time) has elapsed. When the CPU 102 determines that the predetermined cycle Tcyc has elapsed on the basis of an interrupt notification from the timer 127 (S503: Yes), the flow is shifted to step S502, and the clear signal 208 is output to the watchdog timer 203. On the other hand, when the CPU 102 determines that the predetermined cycle Tcyc has not elapsed (S503: No), the flow is shifted to step S504, and whether or not a transition condition to the power saving state is established is determined.

As a result of this determination, in a case where the transition condition to the power saving state is not established (S504: No), the flow is shifted to step S503, and the elapse of the predetermined cycle Tcyc is monitored.

On the other hand, in a case where the transition condition to the power saving state is established (S504: Yes), the flow is shifted to step S505, and the CPU 102 switches the enable signal 209 input to the watchdog timer 203 to the low level.

Next, in step S506, the CPU 102 executes the WFI command and stops the operation of the CPU 102.

Next, in step S507, the CPU 102 stands by until a recovery condition from the power saving state is established. In a case where the CPU 102 receives the interrupt signal corresponding to the recovery condition to the power saving state, for example, it is determined that the recovery condition from the power saving state is established. When the recovery condition from the power saving state is established (S507: Yes), the flow is shifted to step S501, and the CPU 102 switches the enable signal 209 of the watchdog timer 203 to the high level.

Figure 4A:
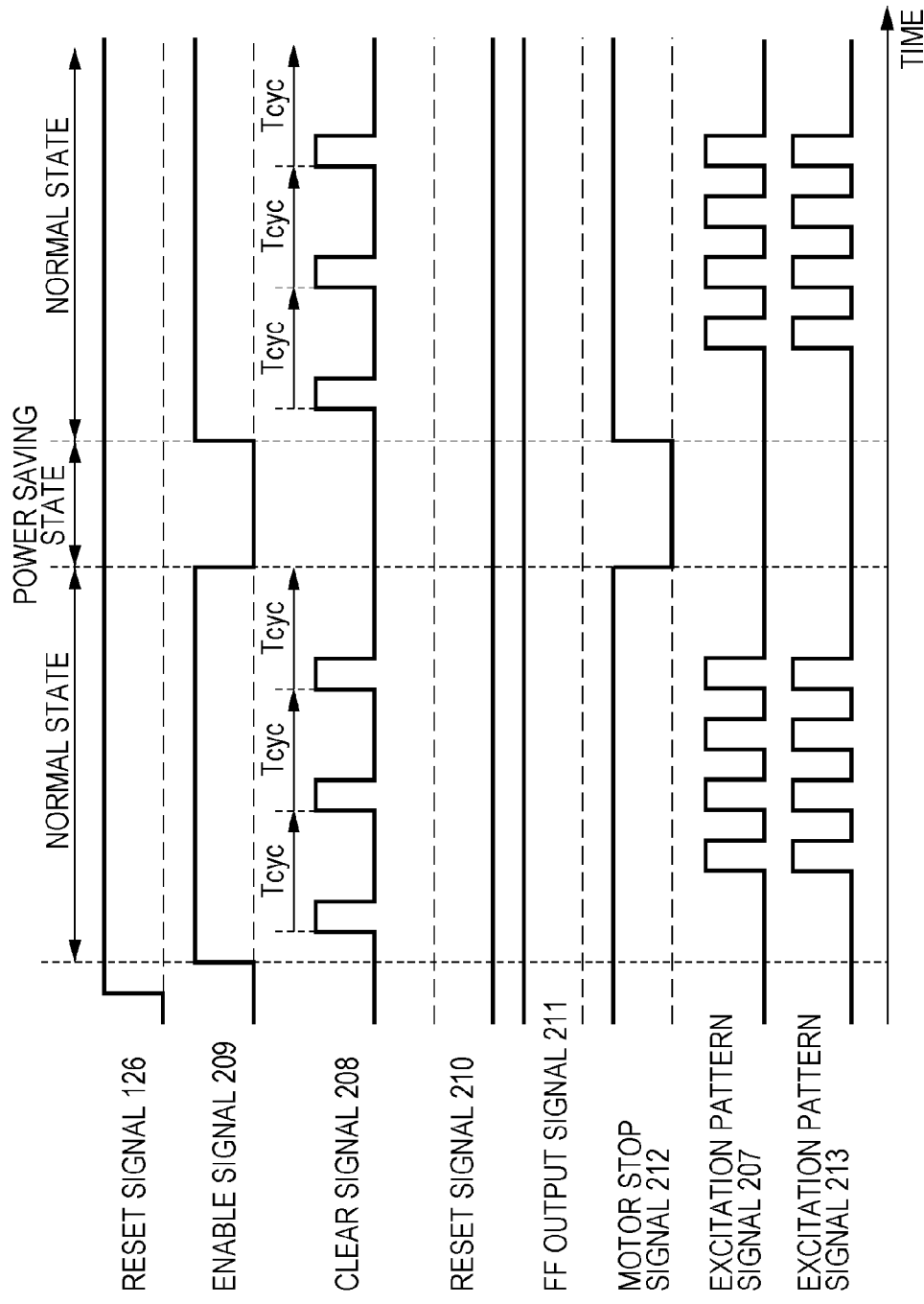
FIG. 4A illustrates a first example of changes in respective signals of the reading unit I/F.
Figure 4B:
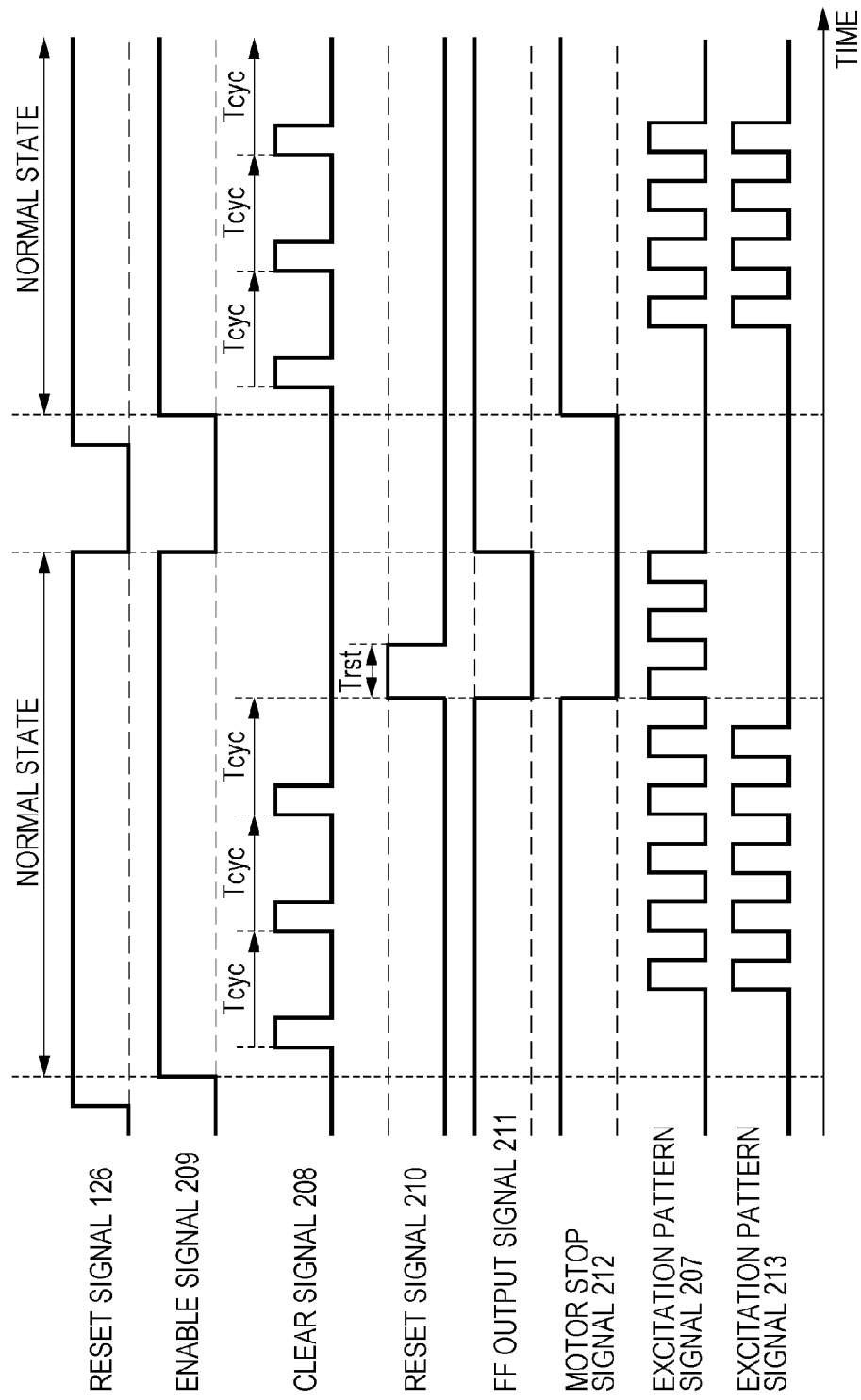
FIG. 4B illustrates a second example of the changes in the respective signals of the reading unit I/F.

FIGS. 4A, 4B, and 4C are timing charts illustrating changes in respective signals of the reading unit I/F 108. Specifically, FIG. 4A is the timing chart illustrating the changes in the respective signals of the reading unit I/F 108 in a case where the CPU 102 performs normal operation. On the other hand, FIG. 4B and FIG. 4C are the timing charts illustrating the changes in the respective signals of the reading unit I/F 108 in a case where abnormal operation is performed when the CPU 102 runs out of control, for example.

In FIG. 4A, first, when the direct-current power source 15a is input from the power source unit 13 to the control unit 10, the reset circuit 125 switches the reset signal 126 from the low level to the high level. As a result, the CPU 102 executes the initialization program and activates the image forming apparatus 1 in the normal state.

The CPU 102 switches the enable signal 209 of the watchdog timer 203 from the low level to the high level in the initialization program (FIG. 5: S501). Thereafter, the CPU 102 outputs the clear signal 208 to the watchdog timer 203 (FIG. 5: S502).

Subsequently, in the normal operation, the CPU 102 repeatedly outputs the clear signal 208 to the predetermined cycle Tcyc.

The reset signal 210 of the watchdog timer 203 is not switched from an initial state (low level). Therefore, the FF output signal 211 of the D flip-flop 204 continues to be in the initial state (high level).

The motor stop signal 212 continues to be in the high level state as long as the enable signal 209 is at the high level.

The excitation pattern signal 207 is output when the motor control circuit 201 receives a setting of the operation from the CPU 102.

Since the motor stop signal 212 is in the high level state, the excitation pattern signal 207 is not cut off by the two-input logical OR operation circuit 205 and is supplied to the motor driver 202 as the excitation pattern signal 213. The motor driver 202 drives the motor 1101 on the basis of the excitation pattern signal 213.

When the power state of the image forming apparatus 1 is switched from the normal state to the power saving state (FIG. 5: S504), the CPU 102 switches the enable signal 209 from the high level to the low level to stop the operation of the watchdog timer 203 (FIG. 5: S505).

Since the operation of the watchdog timer 203 is stopped, the CPU 102 stops the output of the clear signal 208. Subsequently, even when the time longer than or equal to the predetermined cycle Tcyc has elapsed, the reset signal 210 continues to be in the initial state (low level), and also the FF output signal 211 also continues to be in the initial state (high level).

When the enable signal 209 is switched to the low level, the motor stop signal 212 is switched to the low level. Accordingly, the two-input logical OR operation circuit 205 stops the supply of the excitation pattern signal 207. However, in the power saving state, since the direct-current power source 15c for the reading unit 11 of the image forming apparatus 1 is cut off, and the motor 1101 is not also driven, the influence of the motor stop signal 212 is not received as the operation of the image forming apparatus 1.

Thereafter, in a case where the power state of the image forming apparatus 1 is switched from the power saving state to the normal state (FIG. 5: S507), the CPU 102 switches the enable signal 209 from the low level to the high level to operate the watchdog timer 203 (FIG. 5: S501). Then, the CPU 102 resumes the output of the clear signal 208 (FIG. 5: S502).

FIG. 4B illustrates the timing chart in a case where the CPU 102 does not output the clear signal 208 to the watchdog timer 203 because of any cause while the enable signal 209 of the watchdog timer 203 is in the high level state as the abnormal operation.

In FIG. 4B, similarly as in FIG. 4A, the CPU 102 activates the image forming apparatus 1 in the normal state. Thereafter, the CPU 102 switches the enable signal 209 of the watchdog timer 203 to the high level and outputs the clear signal 208 to the watchdog timer 203 (FIG. 5: S501, S502).

Hereinafter, a configuration different from FIG. 4A will be described with reference to FIG. 4B.

If the clear signal 208 is not output from the CPU 102 even when the time longer than or equal to the predetermined cycle Tcyc has elapsed because the CPU 102 runs out of control, the watchdog timer 203 holds the reset signal 210 at the high level for the predetermined period Trst and then returns the reset signal 210 to the low level.

When this rising of the reset signal 210 is received, the D flip-flop 204 switches the FF output signal 211 from the high level to the low level. Subsequently, the D flip-flop 204 holds the FF output signal 211 in the low level state as long as the reset signal 126 from the reset circuit 125 is not switched from the high level to the low level.

The motor stop signal 212 is put into the low level state since the FF output signal 211 is switched to the low level. Therefore, the two-input logical OR operation circuit 205 cuts off the supply of the excitation pattern signal 207 to the motor driver 202 (outputs the signal at the 0 (zero) level as the excitation pattern signal 213). In this manner, even if the excitation pattern signal 207 continues to be output when the CPU 102 runs out of control, the drive of the motor 1101 can be stopped by the motor stop signal 212.

When the power source switch 133 of the image forming apparatus 1 is turned off by the user, and the supply of the direct-current power source 15a from the power source unit 13 to the control unit 10 is cut off, the reset circuit 125 switches the reset signal 126 from the high level to the low level. Accordingly, the CPU 102 is put into the reset state. Thereafter, when the user turns on the power source switch 133 again, the image forming apparatus 1 resumes the activation. Accordingly, the reset circuit 125 switches the reset signal 126 from the low level to the high level.

The state of the motor stop signal 212 at the low level can be cancelled by using a situation as a trigger where the reset signal 126 is switched from the high level to the low level since the power source switch 133 is turned off. Specifically, with the above-described configuration, after the CPU 102 is put into the reset state, and the activation of the image forming apparatus 1 is resumed, while the enable signal 209 from the CPU 102 is switched from the low level to the high level, the state of the motor stop signal 212 at the low level is cancelled. The FF output signal 211 is switched from the low level to the high level at a timing of resetting the CPU 102 (timing when the reset signal 126 is switched from the high level to the low level since the power source switch 133 is turned off).

FIG. 4C illustrates the timing chart in a case where the enable signal 209 of the watchdog timer 203 is in the high level state, and the CPU 102 switches the enable signal 209 to the low level because of any cause as the abnormal operation.

In FIG. 4C, the CPU 102 activates the image forming apparatus 1 in the normal state similarly as in FIG. 4A. Thereafter, the CPU 102 switches the enable signal 209 of the watchdog timer 203 to the high level and outputs the clear signal 208 to the watchdog timer 203 (FIG. 5: S501, S502).

Hereinafter, a configuration different from FIG. 4A will be described with reference to FIG. 4C.

When the enable signal 209 is switched from the high level to the low level because the CPU 102 runs out of control, the D flip-flop 204 switches the motor stop signal 212 to the low level irrespective of the state of the FF output signal 211.

Herein, when the CPU 102 runs out of control because of any cause, the enable signal 209 is switched to the low level, but since the clear signal 208 continues to be normally output, the drive of the motor 1101 continues unless the motor stop signal 212 is switched to the low level.

However, similarly as in FIG. 4B, even if the excitation pattern signal 207 continues to be output, it is possible to stop the drive of the motor 1101 by switching the motor stop signal 212 to the low level.

When the power source switch 133 of the image forming apparatus 1 is turned off by the user, and the supply of the direct-current power source 15a from the power source unit 13 to the control unit 10 is cut off, the reset circuit 125 switches the reset signal 126 from the high level to the low level. Accordingly, the CPU 102 is put into the reset state. Thereafter, when the user turns on the power source switch 133 again, the image forming apparatus 1 resumes the activation. Accordingly, the reset circuit 125 switches the reset signal 126 from the low level to the high level.

As described with reference to FIG. 4B, the state of the motor stop signal 212 at the low level can be cancelled by using a situation as a trigger where the reset signal 126 is switched from the high level to the low level since the power source switch 133 is turned off. Specifically, the state of the motor stop signal 212 at the low level is cancelled when the enable signal 209 is switched from the low level to the high level.

In FIG. 4B and FIG. 4C, the case where the user turns off the power source switch 133 of the image forming apparatus 1 to cut off the supply of the direct-current power source 15a from the power source unit 13 to the control unit 10 has been described as an example as a condition for cancelling the state of the motor stop signal 212 at the low level. However, it is not necessarily the case that the state of the motor stop signal 212 at the low level does not need to be cancelled under the above-described condition.

For example, the state of the signal attributed to the runaway of the CPU 102 may be received by the reset circuit 125, and the reset signal 126 may be output to the control unit 10 to reactivate the image forming apparatus 1. The states of the above-described signal include, for example, temporal rising of the reset signal 210 of the watchdog timer 203 (the predetermined period Trst of FIG. 4B) and trailing of the FF output signal 211 (see FIG. 4B). In addition to the above, trailing of the enable signal 209 when the reset signal 126 is at the high level (when the CPU 102 is not in the reset state) may be received by the reset circuit 125 in the example illustrated in FIG. 4C. Moreover, trailing of the motor stop signal 212 when the reset signal 126 is at the high level (when the CPU 102 is not in the reset state) may be received by the reset circuit 125 in the examples illustrated in FIG. 4B and FIG. 4C.

In addition, the above-described states of the reset signal 210 of the watchdog timer 203 and the FF output signal 211 may be detected by an interrupt terminal (not illustrated) of the CPU 102. In the above-described case, the CPU 102 activates the reset circuit 125 and executes rebooting by itself if the CPU 102 itself can operate.

Moreover, an error notification may be displayed on the display unit of the operation panel 14, and at the same time, a message such as "turn off/on the power source switch" may be displayed to urge the user to performs the reactivation.

Furthermore, when the error illustrated in FIG. 4B and FIG. 4C (runaway of the CPU 102) occurs, the image forming apparatus 1 can detect the error since the operation of the reading unit 11 is not normally ended. In this case, for example, the following configuration may be adopted. That is, at least one of the above-described states of the reset signal 210, the FF output signal 211, and the motor stop signal 212 is detected and stored. Subsequently, in a case where the operation of the motor 1101 is stopped, the CPU 102 analyzes the operation of the CPU 102 corresponding to the cause of the stop after the reset of the CPU 102. As illustrated in FIG. 4B, the state in which the transmission of the clear signal 208 as the operation at the time of the runaway of the CPU 102 is not performed can be identified, for example, by at least one of the rising of the reset signal 210 and the trailing and rising of the FF output signal 211. As illustrated in FIG. 4C, the state in which the CPU 102 stops the watchdog timer 203 as the operation at the time of the runaway of the CPU 102 (the enable signal 209 is set at the low level) can be identified, for example, in the following manner. That is, the state can be identified if no changes in the reset signal 210 and the FF output signal 211 occur at the timing of the trailing of the motor stop signal 212.

As described above, according to the present exemplary embodiment, the motor stop signal 212 is set at the high level in a case where both the FF output signal 211 and the enable signal 209 are at the high level, and the motor stop signal 212 is set at the low level in the other cases. The excitation pattern signal 207 is output to the motor driver 202 as the excitation pattern signal 213 only in a case where the motor stop signal 212 is at the high level. In a case where the CPU 102 does not output the clear signal 208 to the watchdog timer 203 during the operation of the watchdog timer 203, the watchdog timer 203 detects this situation and temporarily sets the reset signal 210 at the high level. Accordingly, the FF output signal 211 turns to the low level, and the output of the excitation pattern signal 207 is blocked. In a case where the CPU 102 switches the enable signal 209 to the low level at a time that is not the timing of resetting the CPU 102, the motor stop signal 212 turns to the low level, and the output of the excitation pattern signal 207 is blocked. Therefore, even if the CPU 102 stops the function of the watchdog timer 203 for stopping the operation of the motor 1101 when the CPU 102 runs out of control, it is possible to reliably stop the operation of the motor 1101.

Modified Example

Next, a modified example of the present exemplary embodiment will be described. According to the present exemplary embodiment, the case where the electric part that stops in the reading unit I/F 108 when the CPU 102 runs out of control is the motor 1101 has been described as an example. However, the electric part that stops in the reading unit I/F 108 is not limited to the motor 1101 and may be any electric part that is mounted to the reading unit 11 controlled by the CPU 102.

Figure 6:
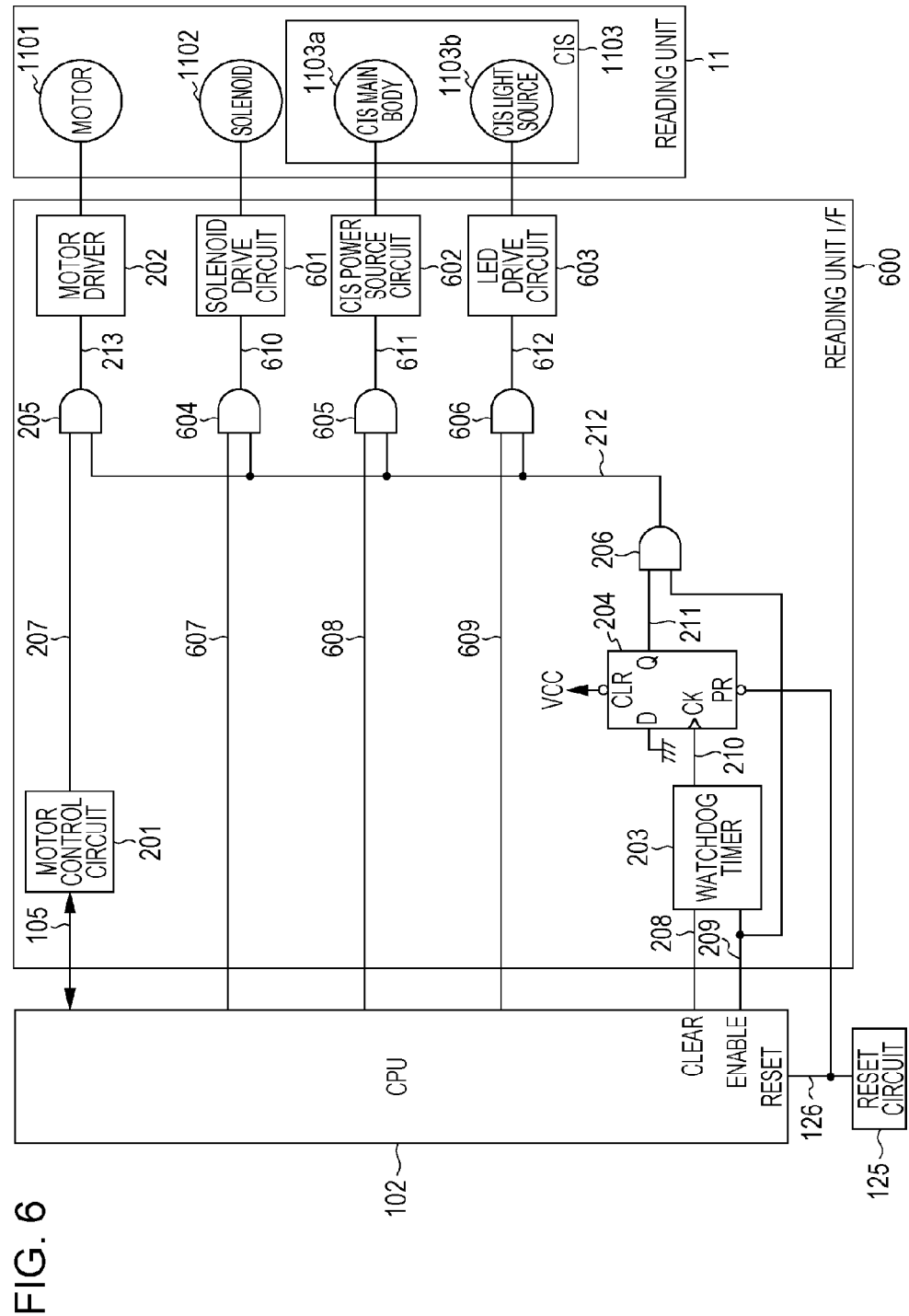
FIG. 6 illustrates a second example of the configuration of the reading unit I/F.

FIG. 6 illustrates an example configuration of a reading unit I/F 600. FIG. 6 is a drawing corresponding to FIG. 2. It is noted that in FIG. 6, the same configurations as those in FIG. 2 are assigned with the same reference symbols and the like assigned in FIG. 2, and detailed descriptions thereof will be omitted.

In the example illustrated in FIG. 6, the image forming apparatus 1 includes a solenoid 1102 and a contact image sensor (hereinafter, CIS) 1103 as electric parts that control the reading unit 11 in addition to the motor 1101.

The solenoid 1102 is an electric part that drives the roller of the reading unit 11 like the motor 1101. The CPU 102 selects a control port 607 and drives a solenoid drive circuit 601. The solenoid 1102 is driven while the power source is supplied from the solenoid drive circuit 601.

The CIS 1103 is constituted by a CIS light source 1103b and a CIS main body 1103a including an image pickup element which are integrally accommodated in a case. The CIS light source 1103b includes light emitting diodes (LEDs) of red, green, and blue.

The CPU 102 selects a control port 608 for the drive of the CIS main body 1103a and supplies the power source to the CIS main body 1103a from a CIS power source circuit 602. The CPU 102 also selects a control port 609 for the drive of the CIS light source 1103b and supplies the power source to the CIS light source 1103b (LED) from a LED drive circuit 603.

As described in the above-described exemplary embodiment, when the CPU 102 runs out of control, respective signals 610, 611, and 612 of the solenoid drive circuit 601, the CIS power source circuit 602, and the LED drive circuit 603 are stopped by the motor stop signal 212 and the enable signal 209. While the cutoff is performed by two-input logical circuits 604, 605, and 606 irrespective of the states of the control respective ports 607, 608, and 609 from the CPU 102, the operations of the solenoid 1102, the CIS main body 1103a, and the CIS light source 1103b can be stopped.

In addition, according to the present exemplary embodiment, the electric part constituting the reading unit 11 of the image forming apparatus 1 has been illustrated as the electric part that stops when the CPU 102 runs out of control. However, the electric part that stops when the CPU 102 runs out of control is not limited to the part included in the reading unit 11 of the image forming apparatus 1. For example, if the part is the electric part driven by the CPU 102 such as the printing unit 12 or the operation panel, the electric part can be stopped when the CPU 102 runs out of control with a configuration similar to the reading unit I/F 108.

It is noted that, according to the present exemplary embodiment, the CPU 102 is an example of a first control unit, the watchdog timer 203 is an example of a detection unit, and the D flip-flop 204 and the two-input logical OR operation circuits 205 and 206 are examples of a second control unit. The excitation pattern signal 207 is an example of a drive signal, and the enable signal 209 is an example of an instruction signal.

The clear signal 208 is an example of a repeating signal.

The reset circuit 125 is an example of a reset unit, and the reset signal 210 is an example of a detection signal.

The D flip-flop 204 is an example of a first circuit, the two-input logical OR operation circuit 206 is an example of a second circuit, and the two-input logical OR operation circuit 205 is an example of a third circuit. The FF output signal 211 is an example of an output signal, and the motor stop signal 212 is an example of a supply permission/inhibition signal.

In addition, the high level in each of the signals is an example of a first level, and the low level is an example of a second level.

It is noted that the above-described exemplary embodiment and modified example are merely embodiment examples to carry out the present invention, and the technical scope of the present invention should not be construed in a limited manner by the exemplary embodiment and the modified example. That is, the present invention can be carried out in various forms without departing from the spirit or the main characteristics of the invention.

The present invention can also be realized by processing in which a program that realizes one or more functions of the above-described exemplary embodiment is supplied to a system or an apparatus via a network or a storage medium, and one or more processors in a computer of the system or the apparatus read out and execute the program. In addition, the present invention can also be realized by a circuit (for example, an ASIC) which realizes one or more functions.

According to the present invention, even when the operation of the unit that outputs the command for driving the electric part is abnormal, and the operation for detecting the abnormality of this unit is stopped, the electric part can be stopped.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-014774, filed Jan. 29, 2014, which is hereby incorporated by reference herein in its entirety.

What is claimed is:

1. An information processing apparatus comprising:
a control unit that outputs a pattern signal for driving an electric part;
a monitoring unit that monitors a state of the control unit and outputs, based on the state of the control unit, a reset signal for stopping the pattern signal from being output to the electric part; and
a control circuit that receives the pattern signal from the control unit and outputs the pattern signal to the electric part,
wherein the control unit outputs an enable signal for preventing the monitoring unit from outputting the reset signal, and
wherein the control circuit stops outputting the pattern signal to the electric part in a case where the reset signal is input to the control circuit and in a case where the enable signal is input to the control circuit.

2. The information processing apparatus according to claim 1,
wherein a power state of the information processing apparatus includes a power saving state,
wherein the control unit outputs the enable signal when a condition for shifting the power state to the power saving state is established, and
wherein the control circuit stops outputting the pattern signal to the electric part in a case where the enable signal is input to the control circuit.

3. The information processing apparatus according to claim 2,
wherein the control unit includes a CPU, and
wherein a clock of the CPU is stopped in the power saving state.

4. The information processing apparatus according to claim 1, wherein the monitoring unit detects that the control unit is not abnormal in a case where a repeating signal cyclically output from the control unit is input and detects that the control unit is abnormal in a case where the repeating signal is not input.

5. The information processing apparatus according to claim 1,
wherein the monitoring unit outputs the reset signal in a case where the monitored state of the control unit is abnormal.

6. The information processing apparatus according to claim 1, wherein the monitoring unit is a watchdog timer.

7. The information processing apparatus according to claim 1, wherein the control circuit includes a D flip-flop, a two-input logical OR operation circuit and another two-input logical OR operation circuit.

8. The information processing apparatus according to claim 7, wherein the reset signal is input to the D flip-flop.

9. The information processing apparatus according to claim 7, wherein the enable signal is input to the two-input logical OR operation circuit.

10. The information processing apparatus according to claim 1, wherein the electric part is a reading unit.

11. A control method for an information processing apparatus, the information processing apparatus having a control unit and a control circuit, the control method comprising:
  outputting from the control unit a pattern signal for driving an electric part;
  monitoring state of the control unit and outputting, based on the state of the control unit, a reset signal for stopping the pattern signal from being output to the electric part; and
  receiving at the control circuit the pattern signal, and outputting from the control circuit the pattern signal to the electric part,
  wherein the outputting from the control unit includes outputting an enable signal for preventing the outputting of the reset signal, and
  wherein the outputting of the pattern signal from the control circuit to the electric part is stopped by the control circuit in a case where the enable signal is input to the control circuit.

\* \* \* \* \*